Nov. 29, 1938.                O. SIEPKE                2,138,359
INDICATING DEVICE
Filed May 28, 1937
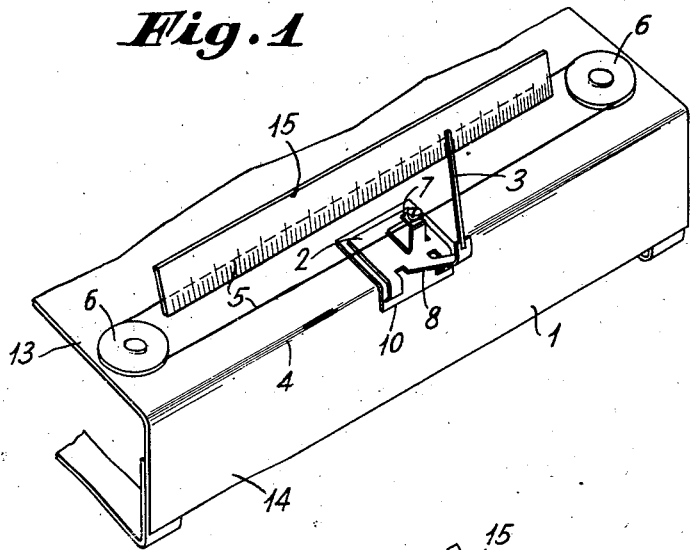
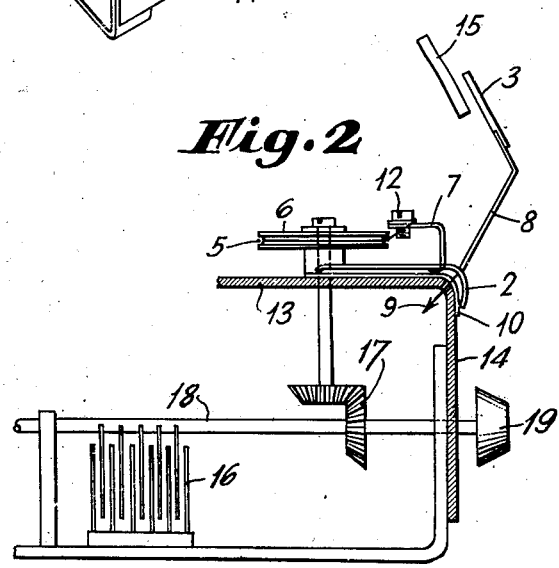
INVENTOR
OTTO SIEPKE
BY
ATTORNEY Patented Nov. 29, 1938

2,138,359

UNITED STATES PATENT OFFICE 2,138,359

INDICATING DEVICE

Otto Siepke, Berlin-Staaken, Germany, assignor to Siemens & Halske Aktiengesellschaft, Siemensstadt, near Berlin, Germany Application May 28, 1937, Serial No. 145,220
In Germany May 29, 1936

4 Claims. (Cl. 116—124.1)

In indicator or dial devices known in the prior art, especially in radio broadcast receivers for setting the apparatus to different stations, the indicator hand or pointer is guided in its movement either by the dial proper or else a glass pane mounted anteriorly thereof, or else special guide strips are disposed on the frame supporting the dial. A disadvantage in this form of construction is that the replacement of the dials or scales occasionally necessary because of a change in the wave-lengths becomes rather difficult; in fact, it is often possible only by removing portions of the pointer guide mechanism such as the slide or its drive means. It will be understood that this involves the risk of a loss of synchronism between the actual position of the pointer and the position of the tuning means. Exact synchronism often is hard to insure because of the fact that the pulleys for the cord drive of the pointer slide are disposed on the frame supporting the scale or dial, and this is rather unstable. For it will be clear that such a frame is liable to become warped or distorted with a resultant relaxing of the cord tension. This causes backlash so that the tuning means drive and the pointer drive will be out of synchronism.

In the arrangement here disclosed which is concerned with the guiding of pointers for station indication in broadcast receiver apparatus and the like, the said drawbacks have been obviated. This has been obtained by using the base plate or mounting plate of the radio receiver for the guidance and supporting of the pointer slide. These base plates of receiver apparatus consist mostly of a box punched out of solid sheet steel and being open in upward direction on which are secured the other component parts of the set as well as the circuit elements. What is here concerned is a particularly stable construction part of a broadcast receiver set which for this reason insures a particularly reliable and invariable guide for the slide of the station indicator device.

The said guide slide, according to the invention, consists essentially of an angle sheet which is laid against one of the edges of the base plate and which is movable by the agency of a cord drive passing over pulleys fixed on the base. This cord drive is united with the means actuating the tuning device, and these also are secured on the base. As a result, all construction elements comprised in the indicator mechanism are arranged on the base plate so that particularly reliable operation is assured. It is thus feasible to mount the scale or dial upon a suitably constructed support in a way entirely independent of the indicator mechanism, the said support being unimpeded by parts of the indicator or tuning device so that the dial is replaceable without the pointer setting means being affected or disturbed.

The invention shall now be described in greater detail by reference to Figs. 1 and 2 representing a perspective and cross-section of one embodiment thereof.

1 denotes the chassis or base plate of a broadcast receiver apparatus consisting of an angular sheet metal piece, on which all construction parts required for the mounting are attached. For guiding and holding the slide for the dial pointer 3, which slide consists of an angular sheet metal piece, there serves the edge 4 of the base plate. To drive the slide is provided a cord or belt drive 5 which is passed over pulleys 6 and which is secured by screw 12 to a lug or angle piece 7 punched out of and bent over the pointer slide 2. The pointer 3 is attached on a similar lug 8, the latter being cut out of the other limb of the angular sheet which constitutes the pointer slide. The driving cord 5 may, as to the rest, be connected with the actuating means 19 for the tuning means here shown as a variable condenser 16 by way of gears 17 and shaft 18. By virtue of the particular mode of arranging the pulleys 6 and the securing cord 5 on the slide 7, it insures the holding of the slide on the edge 4 of the base. For the same purpose, as can be seen especially in Fig. 2, the securing point of cord 5 on the slide 2 is located higher over the base 1 and at greater proximity to the guide edge 4 than the points of contact with pulleys 6. In this manner, the slide 2 is pressed against the edge 4 of the base plate by means of a force directed against the base plate in the sense, roughly, of the bisector of the angle between its top portion 13 and front wall 14 as shown by arrow 9.

The limbs of the slide 2 have been made dissymmetric so that a torque which may be set up by the cord 5 as a result of the higher point of securing may be taken up by the larger leg. Between the pointer slide and the base 1 is preferably interposed an insulating layer 10, also angular in shape, with a view to facilitating the movement of the slide although this may be omitted if desired. The pointer 3 is movable parallel to a graduated scale 15 on which the correct setting of the tuning means may be read.

Having described my invention, what I claim as novel and desire to secure by Letters Patent is:

1. Means for indicating the setting of a tuning device comprising a radio receiver chassis having a flat face, a graduated scale mounted parallel to said face, a slide in engagement with said flat face and having a portion extending adjacent said scale and means connecting said slide to the tuning device.

2. Means for indicating the setting of a tuning device comprising a radio receiver chassis having a flat surface, a graduated scale mounted adjacent said chassis, a belt connected to said tuning device and extending in a direction parallel to said flat surface, a slide engaging said flat face and having a pointer movable alongside said scale and means connecting said slide and belt arranged to cause said slide to press against said flat face.

3. Means for indicating the setting of a tuning device comprising a member having two flat faces inclined to each other, a belt connected to said tuning device and extending in a direction substantially parallel to one of said faces, a graduated scale, a slide formed to engage each of said flat faces and carrying a pointer extending alongside said scale, and means connecting said slide and belt arranged to cause the tension of said belt to cause portions of said slide to lie in contact with said flat faces.

4. Means for indicating the setting of a tuning device comprising a member having a flat surface, a belt connected to said tuning device and extending parallel to said flat surface, a scale, a slide engaging said flat surface and having an integrally formed lug offset from said surface, means securing said lug to said belt, said slide having a second integrally formed lug extending in the direction of said scale and an indicator on said lug positioned for movement alongside said scale.

OTTO SIEPKE.